(12) United States Patent
Ojo et al.

(10) Patent No.: US 11,981,853 B2
(45) Date of Patent: May 14, 2024

(54) CHEMICAL POLYMER DEEP SOIL STABILIZATION COLUMNS AND SAND COLUMNS

(71) Applicant: Saudi Arabian Oil Company, Dhahran (SA)

(72) Inventors: Abiola Ojo, Dhahran (SA); Bassim A. Nawaz, Dammam (SA); Emmanouil Spyropoulos, Dhahran (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 88 days.

(21) Appl. No.: 17/317,367

(22) Filed: May 11, 2021

(65) Prior Publication Data
US 2022/0363991 A1 Nov. 17, 2022

(51) Int. Cl.
*E02D 3/12* (2006.01)
*C09K 17/04* (2006.01)
*C09K 17/22* (2006.01)

(52) U.S. Cl.
CPC .............. *C09K 17/22* (2013.01); *C09K 17/04* (2013.01); *E02D 3/126* (2013.01)

(58) Field of Classification Search
None
See application file for complete search history.

(56) References Cited

U.S. PATENT DOCUMENTS 3,417,968 A * 12/1968 Schlect
3,887,506 A *  6/1975 Hewitt
4,397,588 A    8/1983 Goughnor
4,449,856 A    5/1984 Tokoro et al.
4,606,675 A    8/1986 Mitani et al.
4,733,971 A *  3/1988 Pratt
5,980,446 A   11/1999 Loomis et al.
9,062,431 B2   6/2015 Koehler et al.
9,085,872 B2   7/2015 Kruse (Continued)

FOREIGN PATENT DOCUMENTS

EP    0134106 A2 * 12/1985
EP    1698731 A1    9/2006

(Continued)

OTHER PUBLICATIONS

CN 103835211 A Jun. 4, 2014 (Year: 2014).*

(Continued)

*Primary Examiner* — Charles R Nold
(74) *Attorney, Agent, or Firm* — Leason Ellis LLP (57) ABSTRACT

Methods for installing soil and sand stabilization columns using a chemical polymer are provided. The chemical polymer can be a liquid acrylic base chemical polymer or a liquid vinyl acetate base chemical polymer. In the methods, a dilution rate of a chemical polymer is determined based on at least one of: a moisture content of the soil at a selected soil location, a particle size distribution of the soil at the selected soil location, a shear strength of the soil at the selected soil location, a target strength of the soil stabilization column, and a target stiffness of the soil stabilization column. The chemical polymer is then diluted based on the determined dilution rate. The diluted chemical polymer is inserted into a selected soil location and mixed with in-situ soil or with sand to form a stabilization column.

6 Claims, 6 Drawing Sheets

(56) References Cited

U.S. PATENT DOCUMENTS

| | | | |
|---|---|---|---|
| 10,557,242 B2 | 2/2020 | Kruse | |
| 2001/0048854 A1 | 12/2001 | Carter, Jr. | |
| 2008/0298905 A1* | 12/2008 | Lindenbaum | C12N 9/78 |
| | | | 405/302.6 |

FOREIGN PATENT DOCUMENTS

| | | |
|---|---|---|
| EP | 3135819 A1 | 3/2017 |
| GB | 2509418 A | 7/2014 |
| WO | WO-2016130144 A1 * | 8/2016 |

OTHER PUBLICATIONS

Arasan, Seracettin, et al. "Behavior of polymer columns in soft clayey soil: A preliminary study." Geomechanics and Engineering 10.1 (2016): 95-107.

"Wet Soil Mixing." Keller North America, Dec. 16, 2020, www.keller-na.com/expertise/techniques/wet-soil-mixing.

"Vibroflot Stone Column Bottom Feed." YouTube, YouTube, Apr. 7, 2017, www.youtube.com/watch?v=tNkiWhIRxCE.

\* cited by examiner

CHEMICAL POLYMER DEEP SOIL STABILIZATION COLUMNS AND SAND COLUMNS

TECHNICAL FIELD

The present disclosure is generally related to methods for stabilizing soils for supporting structures.

BACKGROUND

Ground improvement is often required for supporting superstructures, particularly at sites with loose and weak soil conditions. Soil conditions with loose granular or weak cohesive soils have a low bearing capacity and high compressibility and thus are unable to support structural foundations with medium to high loads without soil improvement or deep pile foundation. Examples of conventional techniques for soil improvement include controlled modulus columns (CMC), deep soil mixing (DSM), vibro-concrete columns (VCC), vibro stone columns (vibro replacement), sand compaction pile (SCP), and dynamic replacement. However, these conventional techniques for improving soils generally requiring inclusions, admixtures, or grouting type admixtures.

For example, vibro replacement methods require the addition of stone aggregates, dynamic replacement methods require the addition of sand, gravel, stones or demolition debris, and deep soil mixing techniques require grout or concrete additives. These methods, however, can be costly, time-consuming, and environmentally hazardous. For example, existing methods involving cement or concrete, as well as cement binder, have a high carbon footprint. Additionally, methods involving stone aggregate can be difficult to source, which results in delays and increased costs.

The present application addresses these and other challenges related to stabilizing soils.

SUMMARY

In a first aspect, a method for installing a soil stabilization column is provided, where the method utilizes a rotary mixing shaft and a chemical polymer. In the method, a dilution rate of the chemical polymer is determined based on at least one of: a moisture content of the soil at a selected soil location, a particle size distribution of the soil at the selected soil location, a shear strength of the soil at the selected soil location, a target strength of the soil stabilization column, and a target stiffness of the soil stabilization column. The chemical polymer is then diluted based on the determined dilution rate. The diluted chemical polymer is injected into the selected soil location and the soil is loosened at the selected soil location using the rotary mixing shaft. The soil at the selected soil location is loosened by rotating the rotary mixing shaft in a first direction until it reaches a predetermined depth in the soil, and the diluted chemical polymer is mixed directly with in-situ soil at the selected soil location to form a soil stabilization column at the selected soil location. The rotary mixing shaft is then withdrawn from the selected soil location by rotating the rotary mixing shaft in a second direction once the rotary mixing shaft reaches the predetermined depth in the soil.

In another aspect, the step of diluting the chemical polymer comprises first, adding an amount of water needed to dilute the chemical polymer at the determined dilution rate to a container and second, adding a predetermined amount of chemical polymer to the container, wherein adding the water into the container before the chemical polymer prevents formation of excess foam.

In another aspect, the chemical polymer is not mixed with cementitious grout. In another aspect, the chemical polymer is a liquid acrylic base chemical polymer or a liquid vinyl acetate base chemical polymer.

In another aspect, each soil stabilization column has a diameter of approximately 0.3 meters to 1.2 meters. In another aspect, predetermined depth in the soil of each soil stabilization column is up to 23 meters.

In another aspect, the rotary mixing shaft is withdrawn via rotation in the second direction that is opposite of the first direction and wherein rotation in the second direction further mixes the soil as the rotary mixing shaft is withdrawn.

In another aspect, the soil is a cohesive soil or a heterogeneous soil. In another aspect, determined dilution rate is 0 if in-situ soil moisture is above an optimum moisture content for the soil.

In a second aspect, a method for installing a sand stabilization column in a sand-based soil is provided, where the method utilizes a vibration device and a chemical polymer. In the method, a dilution rate of the chemical polymer is determined based on at least one of: a moisture content of the sand-based soil at a selected soil location, a particle size distribution of the sand-based soil at the selected soil location, a shear strength of the sand-based soil at the selected soil location, a target strength of the sand stabilization column, and a target stiffness of the sand stabilization column. The chemical polymer is diluted based on the determined dilution rate. The diluted chemical polymer is mixed with sand to form a polymer-sand mixture. A surface of the sand-based soil is penetrated with the vibrating device at the selected soil location via induced vibration until the vibration device reaches a predetermined depth in the sand-based soil, thereby creating a void around the vibrating device in the sand-based soil. The polymer-sand mixture is injected into the void and the vibrating device is lifted a predetermined height above the injected polymer-sand mixture. A distal end of the vibrating device is lowered to contact the polymer-sand mixture to densify the mixture. The injecting and lowering steps are repeated until the injected polymer-sand mixture reaches a surface of the void, whereby the vibrating device is removed from the void and the sand stabilization column is created in the void.

In another aspect, the step of diluting the chemical polymer comprises first, adding an amount of water needed to dilute the chemical polymer at the determined dilution rate to a container, and second, adding a predetermined amount of chemical polymer to the container, where adding the water into the container before the chemical polymer prevents formation of excess foam.

In another aspect, the vibrating device is a vibroflot, a vibrating tube, or a displacement auger.

In another aspect, the chemical polymer is not mixed with cementitious grout. In another aspect, the chemical polymer is a liquid acrylic base chemical polymer or a liquid vinyl acetate base chemical polymer.

In another aspect, the diluted chemical polymer is injected into the void from the surface of the sand-based soil above the void. In another aspect, the diluted chemical polymer is injected into the void via a feed pipe attached to the distal end of the vibrating device.

In another aspect, the predetermined height above the injected polymer-sand mixture the vibrating device is lifted is approximately 0.2 to 1 m.

In another aspect, the sand-based soil is a cohesionless soil. In another aspect, the determined dilution rate is 0 if in-situ soil moisture is above an optimum moisture content for the soil.

In another aspect, the step of injecting the polymer-sand mixture into the void comprises a top feed method in which the polymer-sand mixture is fed into the void from the surface of the sand-based soil above the void.

DETAILED DESCRIPTION OF CERTAIN EMBODIMENTS

By way of overview and introduction, the present application discloses methods for installing stabilization columns in soil, including soil stabilization columns and sand stabilization columns. The present methods utilize chemical polymers, and in particular, acrylic-based chemical polymers. The chemical polymers are combined with soil or sand to form stabilization columns, which can be used to support structures or superstructures. The formed stabilization columns are stiff columns for deep soil improvement of weak soils. The methods of the present application can utilize various existing soil improvement machinery, such as a rotary mixing shaft, a displacement auger, a vibroflot, or a vibrating tube, depending the type of soil the stabilization column is formed in. The chemical polymer can be diluted and then injected to a predetermined depth in the soil. The diluted chemical polymer is mixed with sand or in-situ soil to form a stabilization column that extends from the surface of the soil to the predetermined depth in the soil. The chemical polymer acts as a binding agent within the stabilization column to increase the compressive strength and stiffness of the column and thereby create a higher combined soil matrix stiffness with low compressibility. A plurality of formed stabilization columns can be used to support a foundation for a structure or superstructure.

In embodiments in which soil stabilization columns are formed, the diluted chemical polymer is injected in the selected soil locations as the soil is loosened. In embodiments in which a sand stabilization column is formed, as the diluted chemical polymer and sand are injected into the soil, a vibrating device (e.g., vibroflot) is lifted and lowered in an alternating fashion. These alternating steps allow the inject chemical polymer and sand to be compressed to form segments that are stacked on top of one another to form the sand stabilization column. Once a plurality of stabilization columns are formed and are allowed to set, a load transfer platform can be placed on top of the columns to form the base of a structure or superstructure to be supported by the stabilization columns.

These and other aspects of the present methods are described in further detail below with reference to the accompanied drawing figures, in which one or more illustrated embodiments and/or arrangements of the methods are shown. The methods of the present application are not limited in any way to the illustrated embodiments and/or arrangements. It should be understood that the methods as shown in the accompanying figures are merely exemplary of the methods of the present application, which can be embodied in various forms as appreciated by one skilled in the art. Therefore, it is to be understood that any structural and functional details disclosed herein are not to be interpreted as limiting the present methods, but rather are provided as a representative embodiment and/or arrangement for teaching one skilled in the art one or more ways to implement the present methods. As used in the present application, the term "approximately" when used in conjunction with a number refers to any number within 5% of the referenced number, including the referenced number.

In the present methods, one or more chemical polymers are combined with sand or in-situ soil to form the stabilization columns. In one or more embodiments, the chemical polymer is a liquid acrylic base chemical polymer or a liquid vinyl acetate base chemical polymer. Unlike conventional polymer compositions that are used as admixtures for cementitious grout for forming ground improvement structures, the liquid chemical polymers of the present application are mixed directly with in-situ soil or with sand to form stabilization columns without the use of cement or grout.

Figure 1:
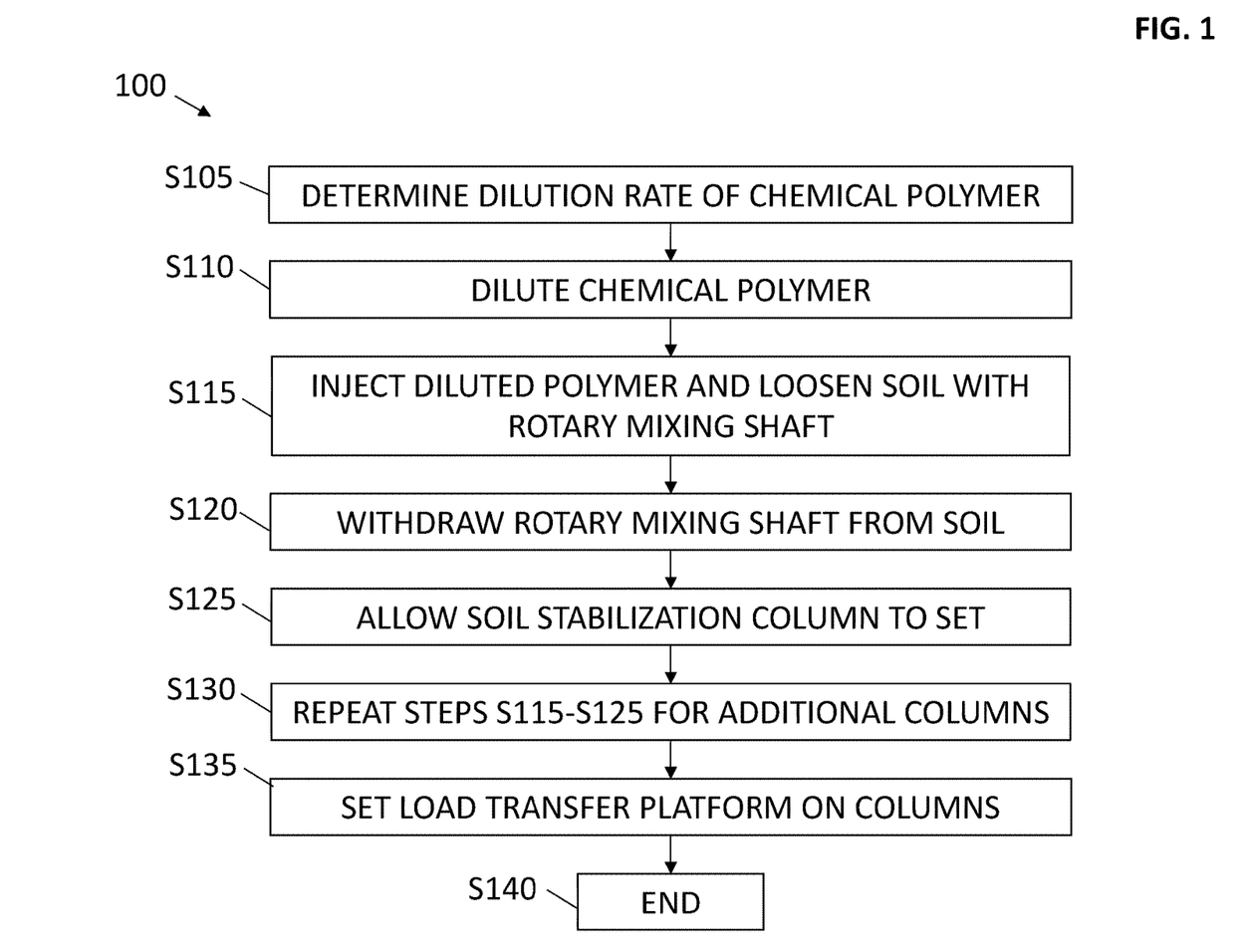
FIG. 1 shows a flow diagram of an exemplary method for installing a soil stabilization column in accordance with one or more embodiments.

FIG. 1 shows a flow diagram of an exemplary method 100 for installing a soil stabilization column in accordance with one or more embodiments. With reference now to FIG. 1, the method 100 begins at step S105, where a dilution rate of the chemical polymer is determined. Before the chemical polymer is mixed with the in-situ soil to form a polymer-soil matrix that is the basis of the stabilization column, the chemical polymer often needs to be diluted with water in order to increases the cohesion, stiffness, and load bearing capability of the polymer-soil matrix. In one or more embodiments, the dilution rate for the chemical polymer is calculated based on at least one of: the moisture content of the soil, a shear strength of the soil, the particle size distribution of the soil, a target strength of the column, and a target stiffness of the column. In at least one embodiment, the dilution rate for the chemical polymer is calculate based on all five of the above factors. One or more soil tests can be performed to determine relevant characteristics of the soil for determining the dilution rate. For example, an Atterberg limits test can be performed on the soil to determine the moisture content of the soil and a particle size distribution test can be performed to determine the texture of the soil. In one or more embodiments, the chemical polymer can range from approximately 2% to 20% by weight of the column to be stabilized, depending on the natural moisture content and optimum moisture content of the soil.

In instances in which the moisture of the in-situ soil is above an optimum moisture content for the soil, the chemical polymer does not need to be diluted (i.e., the determined dilution rate is "0"). As used herein, optimum moisture content (OMC) is the moisture content at which the maximum dry density of the soil can be achieved. The OMC can be obtained from tests conducted on the soil. This in turn provides the maximum stiffness that is attainable for the soil. However, increasing moisture content beyond the OMC will reduce this value. The addition of chemical polymer to replace soil moisture or increased concentration of polymer in saturated soils provides substantial stiffness for the columns. The OMC is not based on the soil strength needed to support any particular structure.

In one or more embodiments, the soil used in the method 100 is a cohesive soil or a heterogeneous soil. In other words, the location selected for the installation of the soil stabilization columns of the present method consists of cohesive soil or heterogeneous soil. Cohesive soils are defined as sticky soils (e.g., silts, clayey silt, clay) whose strength is dependent upon the surface tension of capillary water. Heterogeneous soils are mixtures of sandy soils (e.g., cohesionless soils) and cohesive soils or fine soils.

With continued reference to FIG. 1, at step S110, the chemical polymer is diluted based on the determined dilution rate. The chemical polymer is diluted in a tank or container prior to injection into the soil. In one or more embodiments, to dilute the chemical polymer, the calculated amount of water needed to dilute the chemical polymer at the determined dilution rate is added to a container first. Then, a predetermined amount of the chemical polymer is added to the container. It is advantageous to add the water into the container before the chemical polymer to prevent the formation of excess foam.

In one or more embodiments, one or more additives can also be added to the polymer or diluted polymer. For example, one or more additives can be added to the polymer in instances in which the stabilization column is installed in water-logged soils such as soils below groundwater table. In such instances, the in-situ soil can include excess moisture, and thus the one or more additives will be configured to help maintain the stiffness and cohesiveness of the column in soils with very high moisture content. In one or more embodiments, the one or more additives can be hydrophilic resins either in dry (powder) or liquid form. For example, a calcium acrylate resin in dry form with very small quantities of activators, such as sodium thiosulfate and ammonium persulfate, can be added to the polymer.

Figure 2:
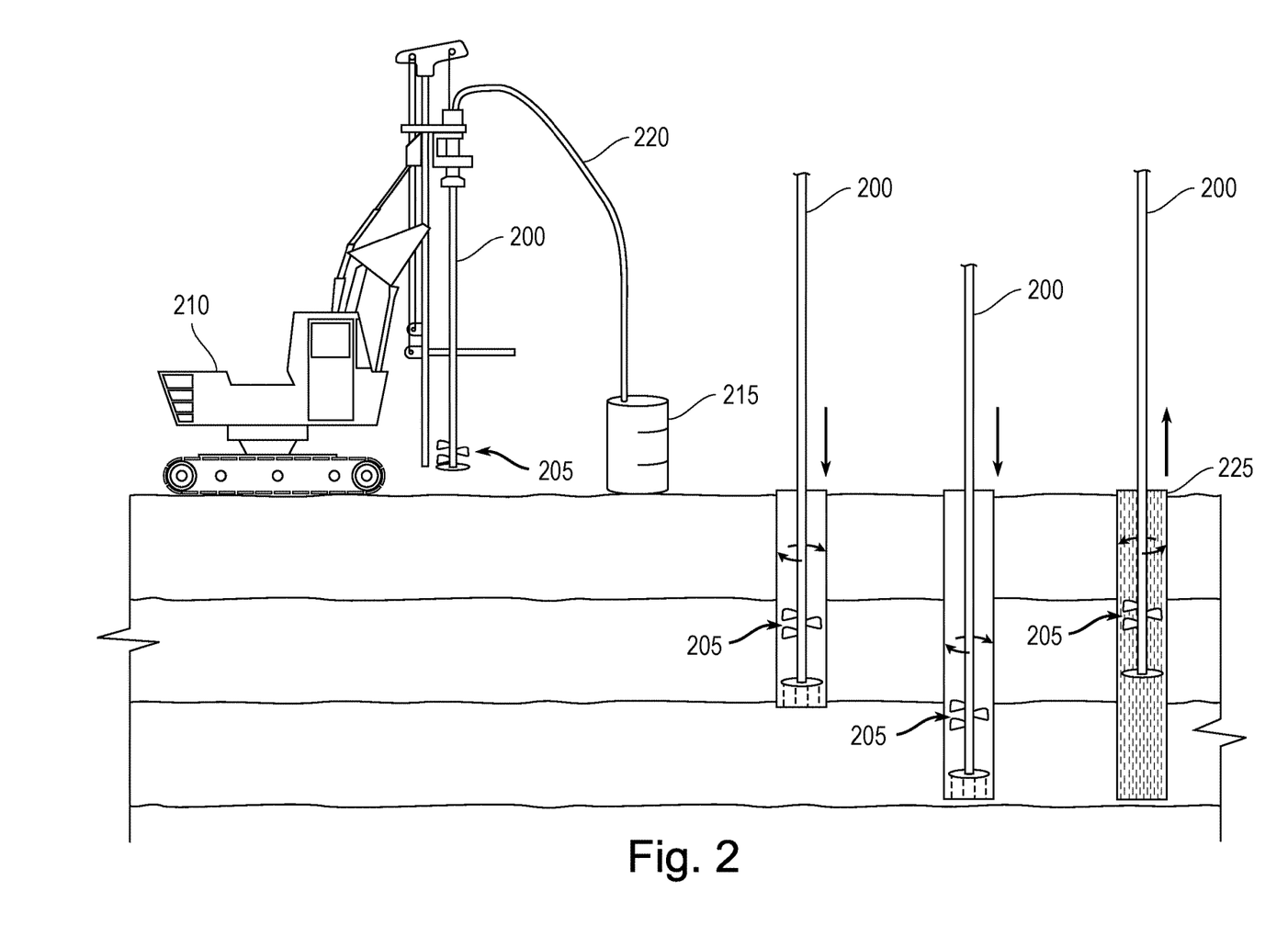
FIG. 2 shows a diagram of stages of an exemplary method for installing a soil stabilization column in accordance with one or more embodiments.

With continued reference to FIG. 1, at step S115, the diluted chemical polymer is injected into the soil at one or more selected locations as the soil at the selected soil locations is loosened using a rotary mixing shaft. A diagram of an exemplary rotary mixing shaft and the stages of an exemplary method for installing a soil stabilization column are shown in FIG. 2 in accordance with one or more embodiments. With reference now to FIG. 2, a rotary mixing shaft 200 can include one or more types of mixers 205 for cutting and loosening the soil. For example, the mixers 205 can include one or more of auger cutting heads, auger flights, and mixing paddles. The rotary mixing shaft 200 can be connected to a construction vehicle 210, for example. The rotary mixing shaft 200 can also be operatively connected to a container 215 used for diluting the chemical polymer via a feed line 220.

The diluted chemical polymer is fed from the container 215 through the feed line 220 to the rotary mixing shaft 200. The diluted chemical polymer is then injected into the soil through holes in the mixers 205 (e.g., auger cutting heads) as the mixers 205 of the rotary mixing shaft 200 simultaneously cut and loosen the soil. The injected chemical polymer mixes with the in-situ soil loosened by the rotary mixing shaft 200. As shown in FIG. 2, as the rotary mixing shaft 200 loosens and cuts the soil, the rotary mixing shaft 200 digs into the soil to a predetermined depth. The injected chemical polymer and the loosened in-situ soil combine to form a polymer-soil matrix, which solidifies to form a soil stabilization column that extends from the predetermined depth up to the surface of the soil.

With reference to FIGS. 1 and 2, at step S120, once the predetermined depth in the soil has been achieved by the rotary mixing shaft 200, the rotary mixing shaft 200 is withdrawn from the soil. In one or more embodiments, the rotary mixing shaft 200 is withdrawn slowly by rotating it in the opposite direction from which it was operated when descending into the soil. For example, in at least one embodiment, the rotary mixing shaft 200 is rotated in a clockwise direction as it digs into the soil, and the rotary mixing shaft 200 is rotated in a counter-clockwise direction during withdrawal. This reverse rotation of the rotary mixing shaft 200 during withdrawal results in further mixing of the soil and the injected chemical polymer. As shown in FIG. 2, as the rotary mixing shaft 200 is withdrawn from the soil, the soil stabilization column begins to take form.

At step S125, once the rotary mixing shaft 200 is withdrawn from the soil, the formed soil stabilization column 225 is allowed to set. In one or more embodiments, the stabilization column needs a minimum of 2 days for curing (to set). In saturated soil conditions (e.g., below water table) the stabilization column may need longer than 2 days to set. The curing time in saturated soil conditions can also be dependent in part on the type of additive added to the polymer. As mentioned above, the soil stabilization column can extend from the predetermined depth reached by the rotary mixing shaft 200 to the surface of the soil. In one or more embodiments, the formed soil stabilization column 225 is approximately 23 meters or less in length. In one or more embodiments, the formed soil stabilization column is approximately 0.3 to 1.2 meters in diameter. In at least one embodiment, the formed soil stabilization column is approximately 0.6 to 1.2 meters in diameter. In one or more embodiments, the soil stabilization column has a minimum depth of approximately 5 meters and a maximum depth of approximately 25 meters in the soil. The width and the maximum depth of the soil stabilization column can be limited by the type and size of installation rig.

At step S130, steps S115-S125 are repeated for the formation of additional soil stabilization columns. In one or more embodiments, a plurality or group of formed soil stabilization columns can be arranged to form a grid. For example, the group of soil stabilization columns can be installed in the soil in a grid pattern with predetermined spacing between each column and at predetermined depths for each column in the soil. The depth of the stabilization columns, the grid pattern of the stabilization columns, and the spacing between the stabilization columns are determined based on soil properties and the geometry and loadings of the foundation and structures the stabilization columns will support. In one or more embodiments, the loadings of the structure (or superstructure) to be supported by the stabilization columns does not exceed 250 kPa. In at least one embodiment, the loading of the structure can exceed 250 kPa in instances where the soil moisture content is very low (e.g., less than 5%) and there is a high chemical polymer concentration in the stabilization column (e.g., maximum mix concentration of 1-part water and 1-part polymer, 1:1 mix ratio). In one or more embodiments, all the columns of the grid have the same depth and diameter.

Figure 3:
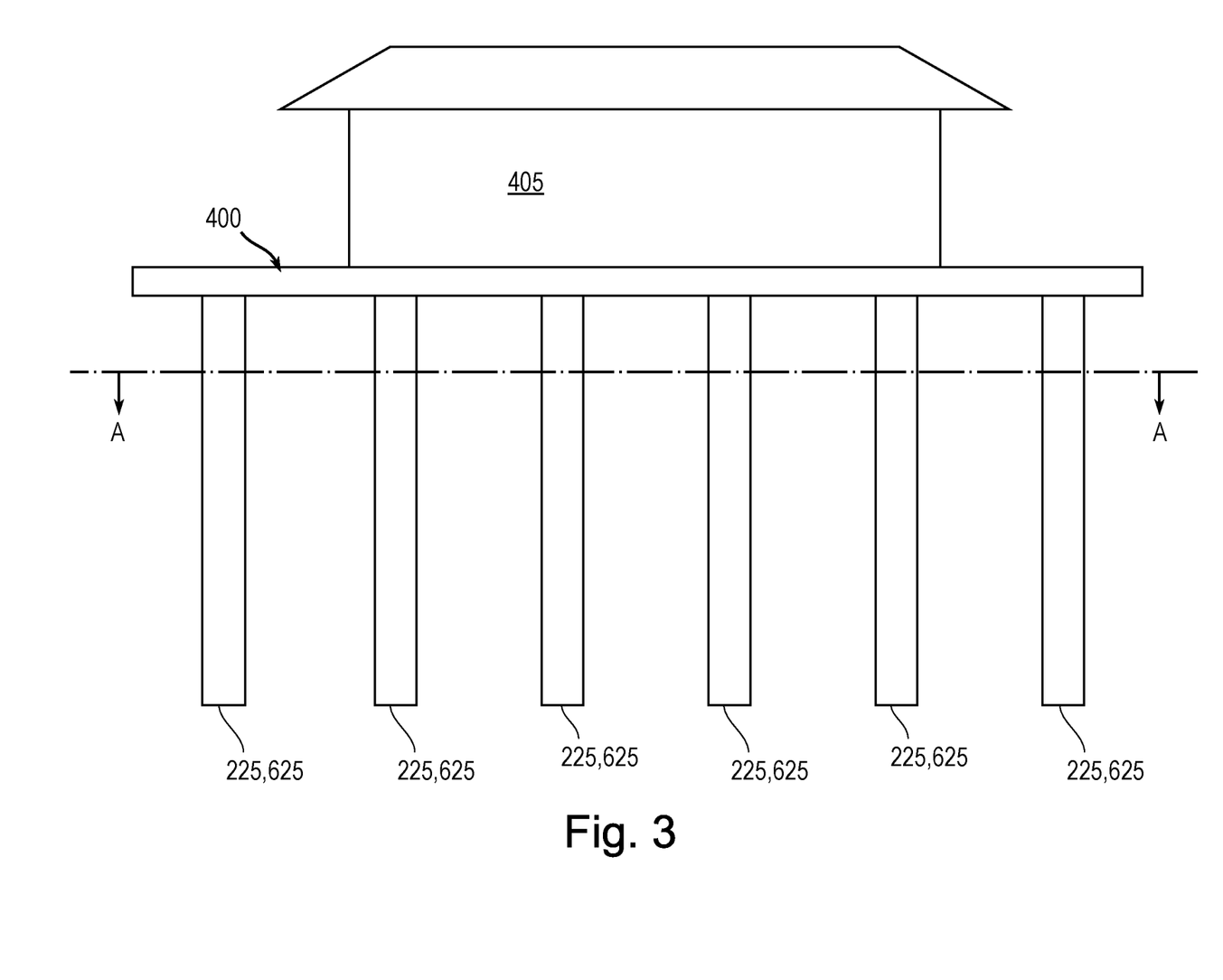
FIG. 3 shows a diagram of installed stabilizations columns (soil or sand stabilization columns) and a load transfer platform supporting a superstructure in accordance with one or more embodiments.
Figure 4:
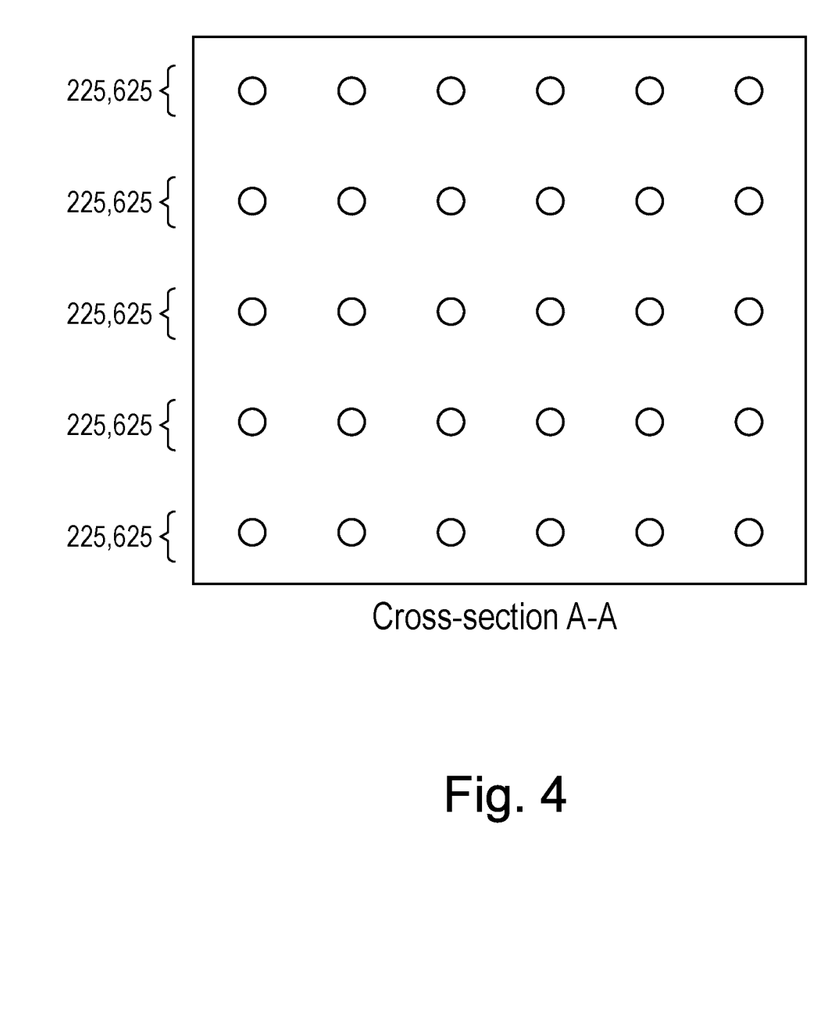
FIG. 4 shows a diagram of a cross-sectional view of a grid of installed stabilization columns (soil or sand stabilization columns) in accordance with one or more embodiments.

Referring again to FIG. 1, at step S135 a load transfer platform is placed on the group of soil stabilization columns. Once the load transform platform has been placed on the soil stabilization columns, the structure or superstructure can be built on top of the platform. FIG. 3 shows a diagram of installed stabilizations columns 225 and a load transfer platform 400 supporting a superstructure 405 in accordance with one or more embodiments. FIG. 4 shows an exemplary diagram of a cross-sectional view of a grid of installed stabilization columns 225 at cross-section A-A in FIG. 3 in accordance with one or more embodiments.

At step S140, the method for installing a soil stabilization column ends.

Figure 5:
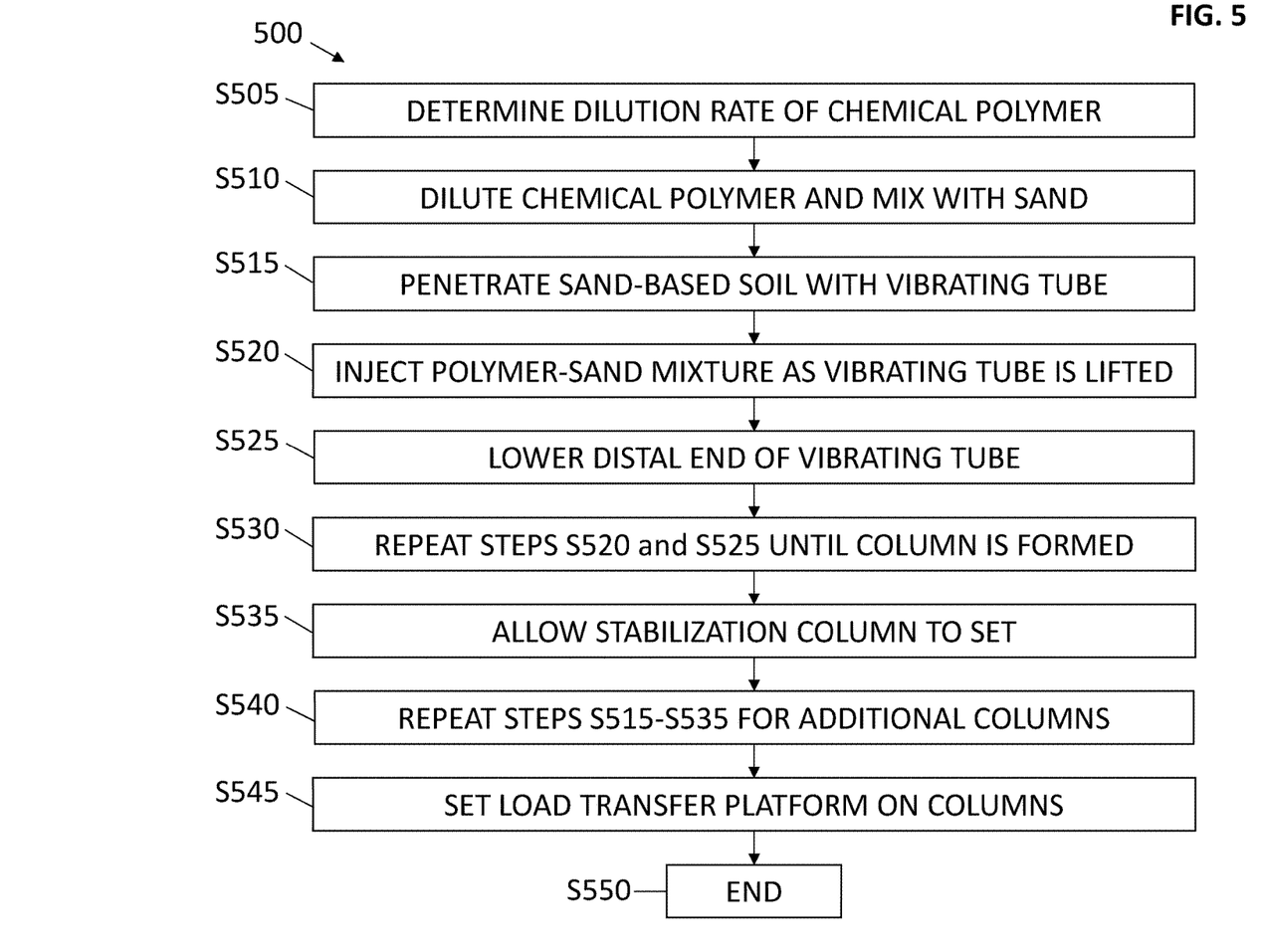
FIG. 5 shows a flow diagram of an exemplary method for installing a sand stabilization column in sand-based soil in accordance with one or more embodiments.

In accordance with one or more embodiments, a method for installing a sand stabilization column is provided. The method for installing a sand stabilization column is generally performed in areas with sand-based soil (e.g. loose sand or silt). For example, in at least one embodiment, the sand-based soil is a cohesionless soil, which is a soil whose strength is dependent upon friction between particles (e.g., such as sand or gravel). FIG. 5 shows a flow diagram of an exemplary method for installing a sand stabilization column in a sand-based soil in accordance with one or more embodiments.

With reference now to FIG. 5, in accordance with one or more embodiments, a method 500 for installing a sand stabilization column begins at step S505, where a dilution rate of a chemical polymer is determined. Step S505 is performed in the same manner as S105 (FIG. 1) is performed in the method for installing a soil stabilization column. In other words, in one or more embodiments, the dilution rate for the chemical polymer is calculated based on at least one of the moisture content of the sand-based soil, a shear strength of the sand-based soil, the particle size distribution of the sand-based soil, a target strength of the column, and a target stiffness of the column. In at least one embodiment, the dilution rate for the chemical polymer is calculate based on all five of the above factors.

Before the chemical polymer is mixed with sand to form the sand stabilization column, the chemical polymer often needs to be diluted with water in order to increases the cohesion, stiffness, and load bearing capability of the matrix of polymer and sand-based soil. In one or more embodiments, the same soil tests performed in the method for installing a soil stabilization column are performed in the method for installing a sand stabilization column in order to determine the dilution rate (e.g., Atterberg limits test, particle size distribution test).

With continued reference to FIG. 5, at step S510, the chemical polymer is diluted based on the determined dilution rate and the diluted chemical polymer is mixed with sand. The dilution portion of step S510 is performed in the same manner as S110 (FIG. 1) is performed in the method for installing a soil stabilization column. Specifically, the chemical polymer is diluted in a container prior to injection into the soil. In one or more embodiments, to dilute the chemical polymer, the calculated amount of water needed to dilute the chemical polymer at the determined dilution rate is added to the container first. Then, a predetermined amount of the chemical polymer is added to the container. In one or more embodiments, the water is added into the tank before the chemical polymer to prevent the formation of excess foam. In one or more embodiments, the chemical polymer can range from approximately 2% to 20% by weight of the column to be stabilized, depending on the natural moisture content and optimum moisture content of the soil.

In instances in which the moisture of the in-situ sand-based soil is above an optimum moisture content for the soil, the chemical polymer does not need to be diluted (i.e., the determined dilution rate is "0"). Once the dilution rate is determined and the chemical polymer is diluted (if needed), the chemical polymer is mixed with sand to form a polymer-sand mixture. In one or more embodiments, the polymer is mixed with graded sand, which is composed of only inorganic material and has a maximum fine content of 15% or less (has from 0 to 15% passing through a No. 200 [0.075-mm] sieve).

In one or more embodiments, one or more additives can be added to the polymer-sand mixture. For example, one or more additives can be added to the polymer-sand matrix in instances in which the stabilization column will be set in water-logged soils such as soils below groundwater table. In such instances, the in-situ sand-based soil can include excess moisture, and thus the one or more additives will be configured to help maintain the stiffness and cohesiveness of the column in soils with very high moisture content. In one or more embodiments, the additives are hydrophilic resins either in dry (powder) or liquid form. The resins can accelerate curing time of the stabilization column after which the matrix becomes hydrophobic. For example, the one or more additives can be a calcium acrylate resin in dry form with very small quantity of activators, such as sodium thiosulfate and ammonium persulfate. However, it should be understood that in one or more embodiments, other additives can be used.

Figure 6:
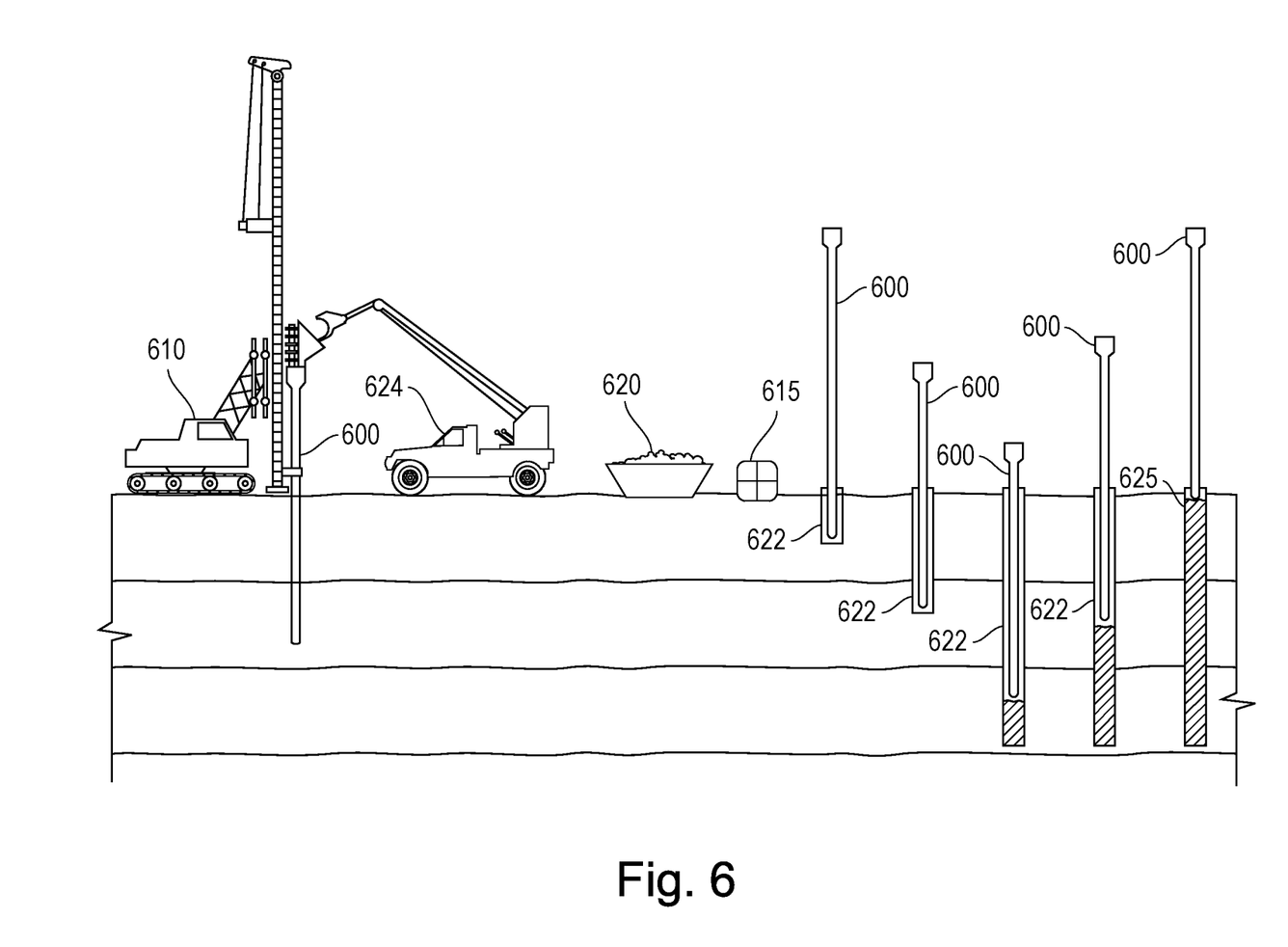
FIG. 6 shows a diagram of stages of an exemplary method for installing a sand stabilization column in a sand-based soil in accordance with one or more embodiments.

At step S515 a surface of the sand-based soil is penetrated via induced vibration using a vibration device until a predetermined depth in the sand-based soil is reached (i.e., the final depth of the sand stabilization column). The induced vibration of the vibration device and the weight of the vibration device creates a void in the sand-based soil around the vibration device. In one or more embodiments, the vibration device is a vibroflot, a vibrating tube, or a displacement auger. A diagram of an exemplary vibrating device and stages of an exemplary method for installing a sand stabilization column are shown in FIG. 6 in accordance with one or more embodiments. As shown in FIG. 6, the vibrating device 600 (in this example, a vibroflot or vibrating tube) can be connected to a construction vehicle 610, for example. A container for holding the diluted chemical polymer is shown at 615 and a container for holding the polymer-sand mixture is shown at 620.

With reference again to FIG. 5, at step S520 a mixture of the diluted chemical polymer and sand (polymer-sand mixture) is injected into the void in the sand-based soil around the vibrating device. In one or more embodiments, the polymer-sand mixture is injected into the void via a top feed method in which the polymer-sand mixture is fed into the void from the surface of the sand-based soil above the void. In at least one embodiment, the polymer-sand mixture is injected into the void via a bottom feed method. In the bottom feed method, the polymer-sand mixture is fed into a feed pipe attached the vibrating device, and the feed pipe feeds the polymer-sand mixture into a bottom end of the void via an outlet of the feed pipe attached to the distal end of the vibrating device. The injected polymer-sand mixture substantially fills a portion of the void from the predetermined depth to a distal end of the vibrating device. FIG. 6 shows a bottom feed in which the polymer-sand mixture in container 620 is transferred from the container 620 to a feed pipe of the of the vibrating device 600 using a vehicle 624 (e.g., backhoe), and then fed into the void 622 via the distal end of the feed pipe at the distal end of the vibrating device 600.

At step S525, the vibrating device is lifted above the portion of the void filled with the polymer-sand mixture and then lowered onto the portion of the portion of the polymer-sand mixture in the void, thereby densifying the underlying polymer-sand mixture by its weight. In one or more embodiments, the vibrating device is lifted approximately 0.5 to 1 meter from the underlying polymer-sand mixture before being lowered onto the polymer-sand mixture for densification. In at least one embodiment, vibrating device is lifted approximately 1 meter before being lowered. In at least one embodiment, the vibrating device is lifted approximately 0.2 to 1 meter from the underlying polymer-sand mixture before being lowered.

In one or more embodiment, the vibrating device is lifted and lowered (rammed) onto the polymer-sand mixture multiple times in quick succession for higher compaction effect. In at least one embodiment, the vibrating device is lifted and rammed onto the polymer-sand mixture 3 to 5 times in quick succession.

At step S530, the steps of injecting the polymer-sand mixture into the void (step S520) and densifying the polymer-sand mixture by lifting and then lowering the vibrating device onto the underlying polymer-sand mixture (steps S525) are repeated until the sand stabilization column is formed. In other words, the sand stabilization column is formed in stages by injecting a portion of the polymer-sand mixture into the void, densifying it with the vibrating device, and then subsequently injecting another portion of the polymer-sand mixture on top of the densified portion. Repeating this pattern of injecting a portion of the polymer-sand mixture and densifying it results in densified portions of the polymer-sand mixture formed on top of one another. Steps S520 and S525 are repeated until the densified portion of the polymer-sand mixture formed on top of one another reach up to the surface of the soil, thereby forming a full sand stabilization column. An exemplary full sand stabilization column 625 is shown at FIG. 6.

At step S535, the formed sand stabilization column is allowed to set. In one or more embodiments, the stabilization column needs a minimum of 2 days for curing (to set). In saturated soil conditions (e.g., below water table) the stabilization column may need longer than 2 days to set. The curing time in saturated soil conditions can also be dependent in part on the type of additive added to the polymer. In one or more embodiments, the formed sand stabilization column is approximately 23 meters or less in length. In one or more embodiments, the formed sand stabilization column is approximately 0.3 to 1.2 meters in diameter. In at least one embodiment, the formed sand stabilization column is approximately 0.6 to 1.2 meters in diameter. In one or more embodiments, the sand stabilization column has a minimum depth of approximately 5 meters and a maximum depth of approximately 25 meters in the soil. The width and the maximum depth of the sand stabilization column can be limited by the type and size of installation rig.

At step S540, steps S515-535 are repeated for the formation of additional sand stabilization columns. In one or more embodiments, the formed sand stabilization columns can be installed in the sand-based soil in a grid pattern with predetermined spacing between each column and at predetermined depths for each column in the sand-based soil. The depth of the stabilization columns, the grid pattern of the stabilization columns, and the spacing between the stabilization columns are determined based on the properties of the sand-based soil and the geometry and loadings of the foundation and structures the stabilization columns will support. In one or more embodiments, the loadings of the structure or superstructure to be supported by the stabilization columns does not exceed 250 kPa. In at least one embodiment, the loading of the structure can exceed 250 kPa in instances where the soil moisture content is very low (e.g., less than 5%) and there is a high chemical polymer concentration in the stabilization column (e.g., maximum mix concentration of 1-part water and 1-part polymer, 1:1 mix ratio). In one or more embodiments, all the columns of the grid have the same depth and diameter. At step S545 a load transfer platform is placed over the group of sand stabilization columns. Like the soil stabilization columns, once the load transform platform has been placed on the sand stabilization columns, the structure or superstructure can be built on top of the platform. FIG. 3 shows a diagram of the installed stabilizations columns 625 and a load transfer platform 400 supporting a superstructure 405 in accordance with one or more embodiments. FIG. 4 shows an exemplary diagram of a cross-sectional view of a grid of installed stabilization columns 625 at cross-section A-A in FIG. 3 in accordance with one or more embodiments.

At step S550, the method for installing a sand stabilization column ends.

Overall, the methods of the present application produce soil and sand stabilization columns that improve strength and stiffness of the surrounding soil. The soil improvement can dependent upon the soil replacement ratio (i.e., the amount of soil replaced with the stabilization columns) and the overall soil stiffness of the soil comprising the stabilization columns, which can be used to assess the uniform load-settlement response of the improved ground based on the anticipated foundation loadings. The stiffness of the polymer-soil or polymer-sand mixture in the stabilization columns can achieve up to 10 to 100 times that of a treated soil area and depth of treatment under a foundation.

The present methods also provide additional advantages over conventional soil improvement methods. For example, the chemical polymers of the present methods are non-hazardous and environmentally friendly. The present methods also eliminate the need for more costly and environmental damaging products such as a cement binder, which is less environmentally friendly with a high carbon footprint, and crushed quarry stone aggregate, which can be costly due to it scarcity in certain regions. Thus, the present methods are cost-effective, environmentally friendly, and time effective techniques to improve the strength of weak soils for accommodating the load of a superstructure. Moreover, the present methods provide soil improvement solutions for all soil types, especially sandy and silty soils. Finally, the methods of the present application are effective alternatives to conventional methods that utilize stone columns, rigid inclusions, and deep soil mixing.

Although much of the foregoing description has been directed to methods for installing soil and sand stabilization columns, the methods disclosed herein can be similarly deployed and/or implemented in scenarios, situations, and settings far beyond the referenced scenarios. It should be further understood that any such implementation and/or deployment is within the scope of the methods described herein.

It is to be further understood that like numerals in the drawings represent like elements through the several figures, and that not all components and/or steps described and illustrated with reference to the figures are required for all embodiments or arrangements. Further, the terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms ""including," "comprising," or "having," "containing," "involving," and variations thereof herein, when used in this specification, specify the presence of stated features, integers, steps, operations, elements, and/or components, but do not preclude the presence or addition of one or more other features, integers, steps, operations, elements, components, and/or groups thereof.

It should be noted that use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Notably, the figures and examples above are not meant to limit the scope of the present disclosure to a single implementation, as other implementations are possible by way of interchange of some or all the described or illustrated elements. Moreover, where certain elements of the present disclosure can be partially or fully implemented using known components, only those portions of such known components that are necessary for an understanding of the present disclosure are described, and detailed descriptions of other portions of such known components are omitted so as not to obscure the disclosure. In the present specification, an implementation showing a singular component should not necessarily be limited to other implementations including a plurality of the same component, and vice-versa, unless explicitly stated otherwise herein. Moreover, applicants do not intend for any term in the specification or claims to be ascribed an uncommon or special meaning unless explicitly set forth as such. Further, the present disclosure encompasses present and future known equivalents to the known components referred to herein by way of illustration.

The foregoing description of the specific implementations will so fully reveal the general nature of the disclosure that others can, by applying knowledge within the skill of the relevant art(s), readily modify and/or adapt for various applications such specific implementations, without undue experimentation, without departing from the general concept of the present disclosure. Such adaptations and modifications are therefore intended to be within the meaning and range of equivalents of the disclosed implementations, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance presented herein, in combination with the knowledge of one skilled in the relevant art(s). It is to be understood that dimensions discussed or shown are drawings are shown accordingly to one example and other dimensions can be used without departing from the disclosure.

The subject matter described above is provided by way of illustration only and should not be construed as limiting. Various modifications and changes can be made to the subject matter described herein without following the example embodiments and applications illustrated and described, and without departing from the true spirit and scope of the invention encompassed by the present disclosure, which is defined by the set of recitations in the following claims and by structures and functions or steps which are equivalent to these recitations.

What is claimed is:

1. A method for installing a soil stabilization column, wherein the method utilizes a rotary mixing shaft and a chemical polymer, the method comprising:
   measuring a moisture content of the soil at a selected soil location,
   injecting a liquid vinyl acetate chemical polymer into the selected soil location and loosening soil at the selected soil location using the rotary mixing shaft, wherein the soil at the selected soil location is loosened by rotating the rotary mixing shaft in a first direction until it reaches a predetermined depth in the soil, and wherein the liquid vinyl acetate chemical polymer is mixed directly with in-situ soil at the selected soil location to form a soil stabilization column at the selected soil location, and wherein if the measured moisture content of the soil at the selected soil location is above an optimum moisture content for the soil, the liquid vinyl acetate is injected in undiluted form, and wherein if the measured moisture content of the soil at the selected soil location is below the optimum moisture content, the liquid vinyl acetate is diluted with water prior to injection; and
   withdrawing the rotary mixing shaft from the selected soil location by rotating the rotary mixing shaft in a second direction once the rotary mixing shaft reaches the predetermined depth in the soil,
   wherein the liquid vinyl acetate chemical polymer is approximately 2% to 20% by weight of the soil stabilization column, and wherein the soil stabilization column is installed at a minimum depth of approximately 5 meters and a maximum depth of approximately 25 meters in the soil.

2. The method of claim 1, wherein the liquid vinyl acetate chemical polymer is diluted by:
   first, adding an amount of water to a container; and
   second, adding the liquid vinyl acetate chemical polymer to the container, wherein adding the water into the container before the chemical polymer prevents formation of excess foam.

3. The method of claim 1, wherein the chemical polymer is not mixed with cementitious grout.

4. The method of claim 1, wherein each soil stabilization column has a diameter of approximately 0.3 meters to 1.2 meters.

5. The method of claim 1, wherein the rotary mixing shaft is withdrawn via rotation in the second direction that is opposite of the first direction and wherein rotation in the second direction further mixes the soil as the rotary mixing shaft is withdrawn.

6. The method of claim 1, wherein the soil is a cohesive soil or a heterogeneous soil.

\* \* \* \* \*